(12) United States Patent
Tanji

(10) Patent No.: US 12,719,363 B2
(45) Date of Patent: Aug. 25, 2026

(54) SWITCHING REGULATOR PROVIDED WITH VOLTAGE DIFFERENCE DETECTOR INCLUDING INTEGRATION CIRCUIT

(71) Applicant: NISSHINBO MICRO DEVICES INC., Tokyo (JP)

(72) Inventor: Kagehito Tanji, Ikeda (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 133 days.

(21) Appl. No.: 18/865,505

(22) PCT Filed: Jun. 7, 2022

(86) PCT No.: PCT/JP2022/022971
§ 371 (c)(1),
(2) Date: Nov. 13, 2024

(87) PCT Pub. No.: WO2023/238241
PCT Pub. Date: Dec. 14, 2023

(65) Prior Publication Data

US 2025/0309765 A1 Oct. 2, 2025

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05)

(58) Field of Classification Search
CPC .. H02M 3/156; H02M 3/1563; H02M 3/1566; H02M 3/157; H02M 3/158;
(Continued)

(56) References Cited

U.S. PATENT DOCUMENTS 12,562,648 B2 * 2/2026 Yoon .................. H02M 3/1582
2006/0208715 A1 9/2006 Saeki et al.
(Continued)

FOREIGN PATENT DOCUMENTS

JP 2006-033958 A 2/2006
JP 2006-296186 A 10/2006
(Continued)

OTHER PUBLICATIONS

International Search Report dated Aug. 23, 2022 in connection with PCT/JP2022/022971.
(Continued)

*Primary Examiner* — Nguyen Tran
(74) *Attorney, Agent, or Firm* — Paul Teng

(57) ABSTRACT

A switching regulator includes: a switching circuit that switches an input voltage based on a gate control signal, and outputs a switching voltage; a voltage difference detector that compares the switching voltage with a threshold value depending on the input voltage, and outputs a comparison result signal; and a control circuit that generates a gate control signal based on an output voltage to which the switching voltage is fed back after smoothed and the comparison result signal, and outputs the gate control signal to the switching circuit. The voltage difference detector includes: an integration circuit that generates a pseudo-output voltage obtained by integrating the switching voltage on time and substantially equal to the output voltage; and a comparator circuit that compares the pseudo-output voltage with a threshold value depending on a power supply voltage, and outputs the comparison result signal.

10 Claims, 18 Drawing Sheets

(58) Field of Classification Search
CPC ............. H02M 3/1582; H02M 3/1586; H02M 1/0003; H02M 1/0006; H02M 1/0009; H02M 1/0012
See application file for complete search history.

(56) References Cited

U.S. PATENT DOCUMENTS

| | | | | |
|---|---|---|---|---|
| 2009/0322303 | A1* | 12/2009 | Hirata | H02M 3/156 323/284 |
| 2025/0357846 | A1* | 11/2025 | Tanji | H02M 1/083 |

FOREIGN PATENT DOCUMENTS

| | | | |
|---|---|---|---|
| JP | 2011-205743 | A | 10/2011 |
| JP | 2015-061431 | A | 3/2015 |

OTHER PUBLICATIONS

Dec. 19, 2024 Notification Of Transmittal of Translation of the International Preliminary Report on Patentability (IPRP) in connection with PCT/JP2022/022971.

* cited by examiner

FIRST EMBODIMENT

PWM SYSTEM

PFM SYSTEM

FIRST MODIFIED EMBODIMENT

SECOND MODIFIED EMBODIMENT

THIRD MODIFIED EMBODIMENT

FOURTH MODIFIED EMBODIMENT

THIRD EMBODIMENT

FOURTH EMBODIMENT

FIFTH EMBODIMENT

Fig. 14

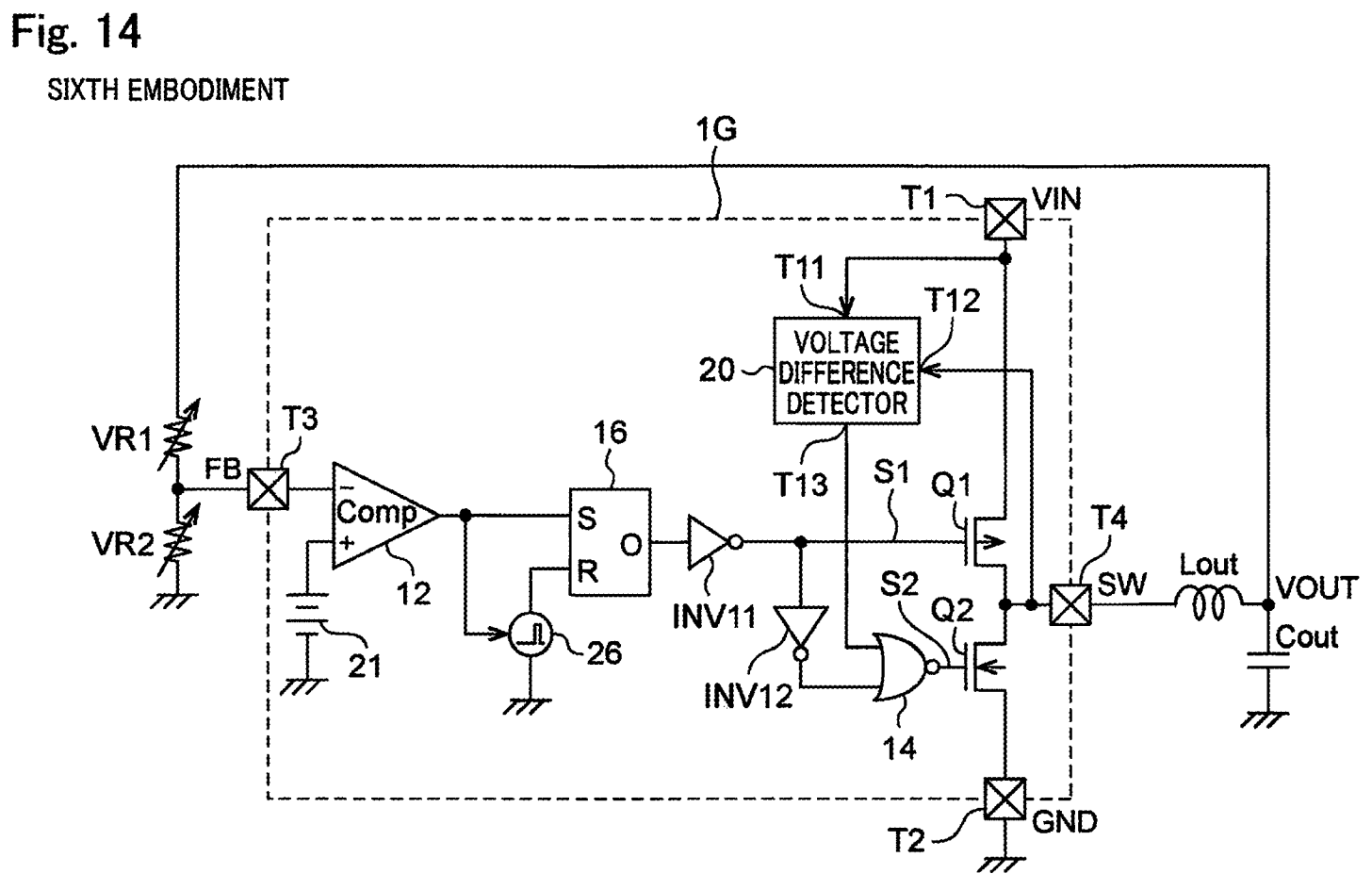

SIXTH EMBODIMENT

VOUT
Cout
Lout
SW
T4
VIN
GND
T1
T12
Q1
Q2
T2
S1
S2
14
VOLTAGE DIFFERENCE DETECTOR
T11
T13
INV11
INV12
20
1G
16
S
R
O
26
12
Comp
21
T3
FB
VR1
VR2

Fig. 15

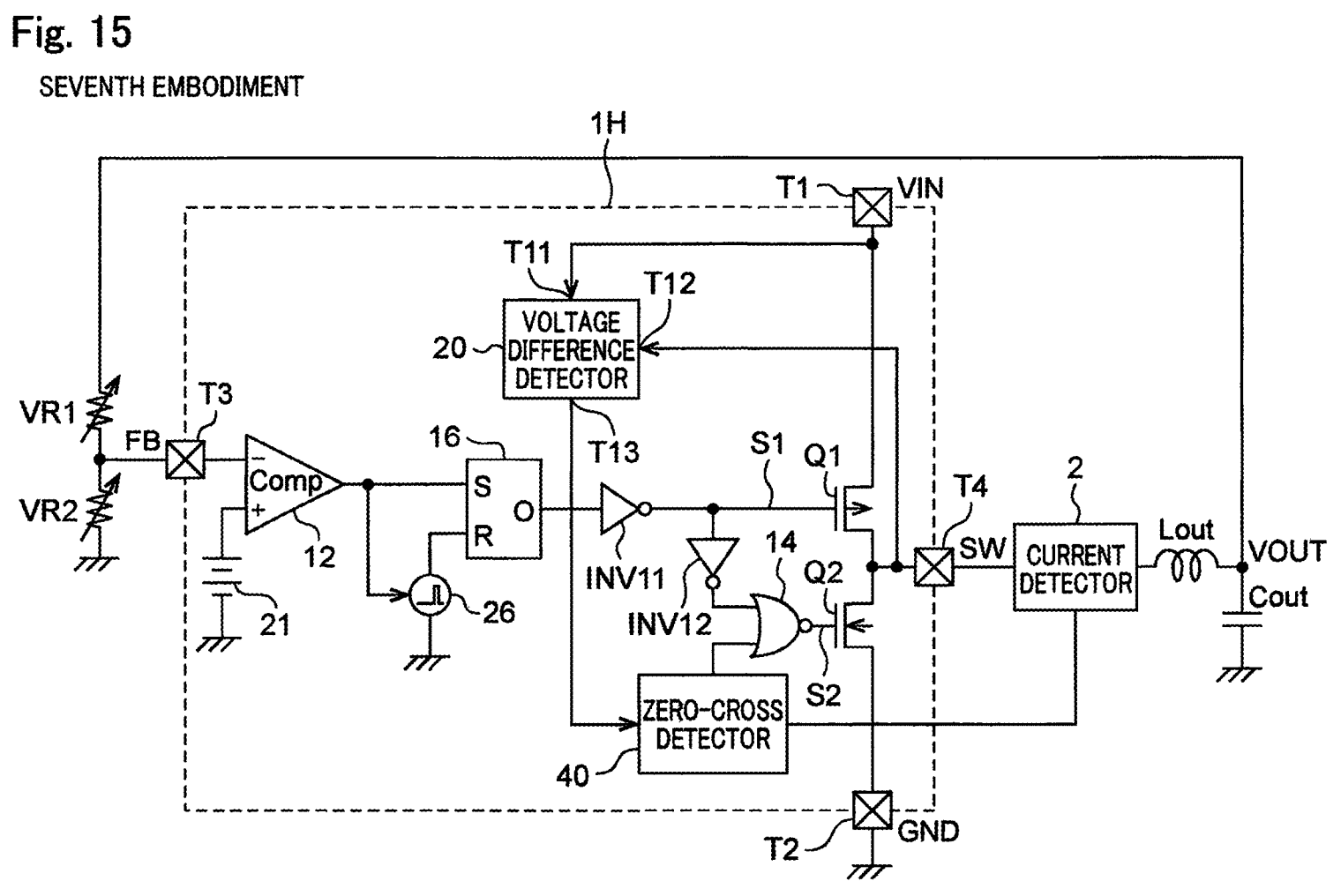

SEVENTH EMBODIMENT

VOUT
Cout
Lout
2
CURRENT DETECTOR
T4
SW
VIN
GND
T1
T2
Q1
Q2
S1
S2
14
INV11
INV12
ZERO-CROSS DETECTOR
40
T12
T11
T13
VOLTAGE DIFFERENCE DETECTOR
20
1H
S
R
O
16
26
Comp
12
21
T3
FB
VR1
VR2

Fig. 16

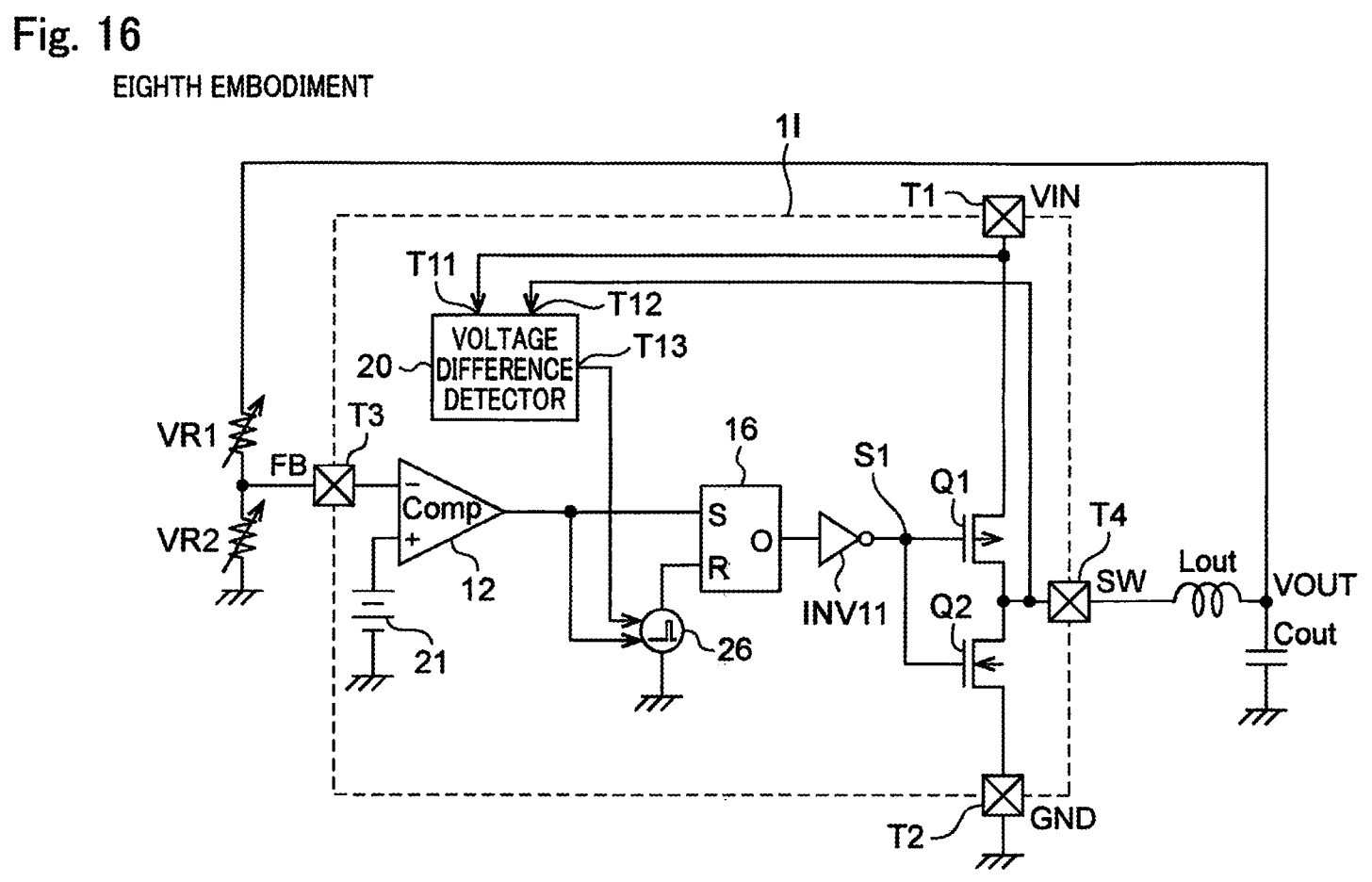

EIGHTH EMBODIMENT

VOUT
Cout
Lout
SW
T4
VIN
GND
T1
Q1
Q2
T2
S1
INV11
1I
16
S
O
R
26
T12
T13
VOLTAGE DIFFERENCE DETECTOR
T11
20
Comp
12
21
T3
FB
VR1
VR2

NINTH EMBODIMENT

Fig. 18

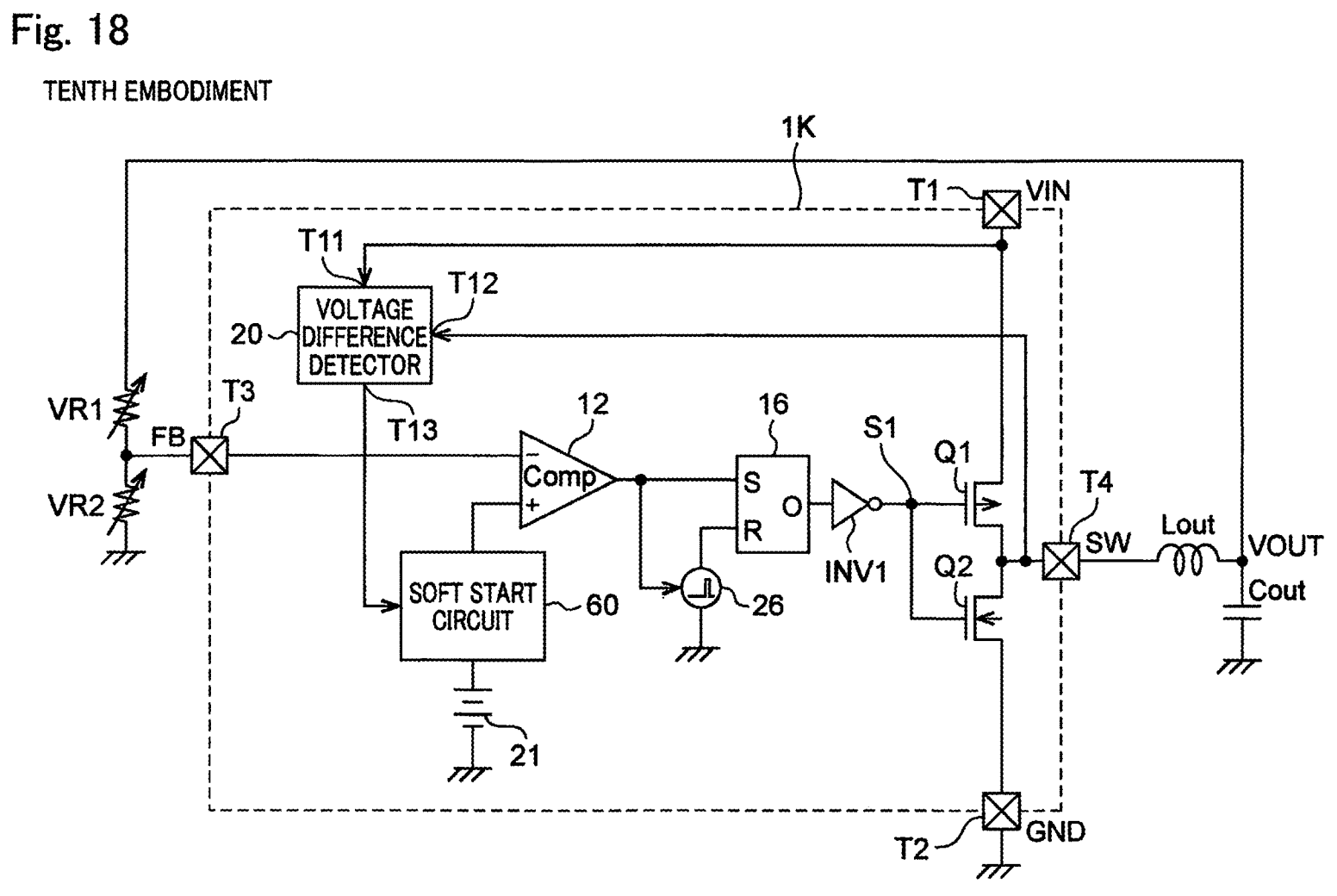

TENTH EMBODIMENT

VOUT
Cout
Lout
T4
SW
VIN
T1
1K
GND
T2
Q1
Q2
S1
INV1
16
S
O
R
26
12
Comp
−
+
60
SOFT START CIRCUIT
21
T12
VOLTAGE DIFFERENCE DETECTOR
T13
T11
20
T3
FB
VR1
VR2

ELEVENTH EMBODIMENT

FIRST COMPARATIVE EXAMPLE

SECOND COMPARATIVE EXAMPLE

THIRD COMPARATIVE EXAMPLE

FOURTH COMPARATIVE EXAMPLE

SWITCHING REGULATOR PROVIDED WITH VOLTAGE DIFFERENCE DETECTOR INCLUDING INTEGRATION CIRCUIT

TECHNICAL FIELD

The present invention relates to a switching regulator applied to, for example, a power conversion apparatus.

BACKGROUND ART

Conventionally, it has been already known that a switching regulator uses a specific sequence when an input and output voltage difference such as a battery through mode is small.

For example, Patent Document 1 discloses a switching converter of a conventional example in which a drive unit is provided for each of a plurality of switches and each switch is controlled according to a load current, an input voltage, an output voltage, and an input and output voltage to improve conversion efficiency at the time of DC-DC conversion.

In the switching converter of the conventional example, when a plurality of first switches and a plurality of second switches are alternately and synchronously rectified as an on state, the plurality of first switches are repeatedly driven to an on or off state according to a required output, the plurality of second switches are driven to an on or off state in synchronization with the first switches, and driving of a part of the plurality of first switches and driving of a part or all of the plurality of second switches are stopped according to a load current, an output voltage, an input voltage, or an input and output voltage difference.

PRIOR ART DOCUMENT

Patent Document

Patent Document 1: Japanese patent laid-open publication No. JP2006-296186A

SUMMARY OF THE INVENTION

Problems to be Solved by the Invention

However, in an input and output voltage monitoring circuit using the conventional voltage detection circuit, it is necessary to take in and compare a power supply voltage and an output voltage, and in an external adjustment circuit of the output voltage in which a customer can arbitrarily set a feedback rate, there is a problem that the output voltage cannot be monitored.

In the above-described switching converter of the conventional example, a configuration for monitoring a power supply voltage and an output voltage for the purpose of switching control by an input and output voltage difference is disclosed. However, the problem that it is not possible to cope with the case where there is no terminal for monitoring the output voltage has not been solved.

An object of the present invention is to solve the above problems and to provide a switching regulator capable of generating a comparison result signal related to an input and output voltage difference even with no terminal for monitoring an output voltage in the switching regulator.

Solutions to the Problems

According to one aspect of the present disclosure, there is provided a switching regulator including a switching circuit, a voltage difference detector, and a control circuit. The switching circuit is configured to switch an input voltage based on a predetermined gate control signal, and output a switching voltage, and the voltage difference detector is configured to compare the switching voltage with a threshold value dependent on the input voltage, and output a comparison result signal. The control circuit is configured to generate the gate control signal based on an output voltage which is obtained by smoothing the switching voltage and is fed back, and the comparison result signal, and output the gate control signal to the switching circuit. The voltage difference detector includes an integrator circuit, and a comparator circuit. The integrator circuit is configured to generate and output a pseudo-output voltage that is obtained by time-integrating the switching voltage and is substantially equal to the output voltage. The comparator circuit is configured to compare the pseudo-output voltage with a threshold value dependent on a power supply voltage, and output the comparison result signal.

Effects of the Invention

Therefore, according to the switching regulator of the present invention, since the comparison result signal is generated by comparing the voltage obtained by time-integrating the switching voltage with the threshold value dependent on the power supply voltage, it is possible to generate the comparison result signal related to the input and output voltage difference even with no terminal for monitoring the output voltage.

BRIEF DESCRIPTION OF THE DRAWINGS

FIG. 14 is a circuit diagram illustrating a configuration example of a switching regulator 1G according to a sixth embodiment.

FIG. 15 is a circuit diagram illustrating a configuration example of a switching regulator 1H according to a seventh embodiment.

FIG. 16 is a circuit diagram illustrating a configuration example of a switching regulator 1I according to an eighth embodiment.

FIG. 18 is a circuit diagram illustrating a configuration example of a switching regulator 1K according to a tenth embodiment.

DETAILED DESCRIPTION

Figure 1:
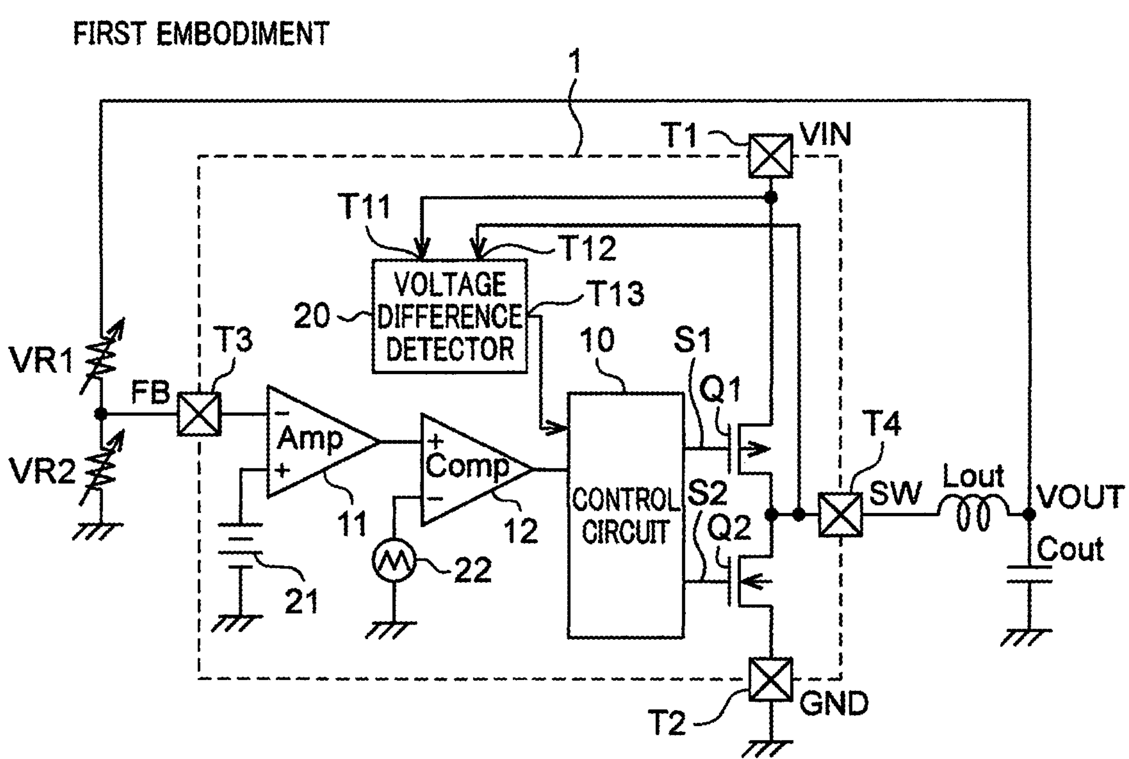
FIG. 1 is a circuit diagram illustrating a configuration example of a switching regulator 1 according to a first embodiment.

Hereinafter, embodiments and modified embodiments according to the present invention will be described with reference to the drawings. It is noted that the same or similar components are denoted by the same reference numerals.

FINDINGS OF INVENTORS

First Comparative Example

Figure 20:
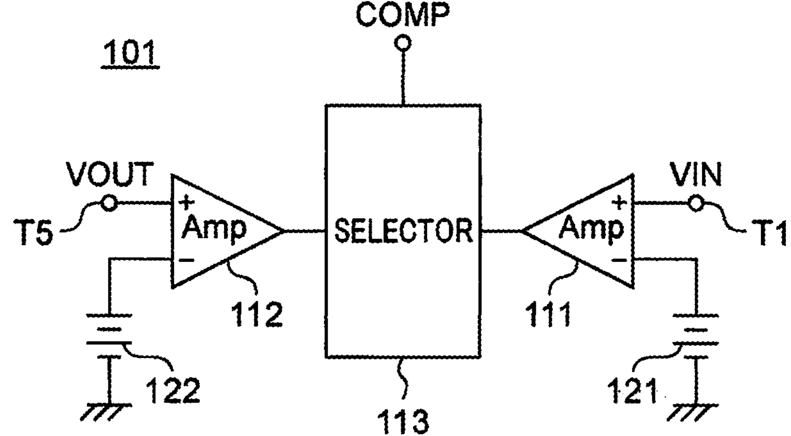
FIG. 20 is a circuit diagram illustrating a configuration of an input and output voltage monitoring circuit 101 according to First Comparative example.

FIG. 20 is a circuit diagram illustrating a configuration of an input and output voltage monitoring circuit 101 according to First Comparative example. Referring to FIG. 20, the input and output voltage monitoring circuit 101 is configured to include two differential amplifiers 111 and 112 and a selector 113.

In the input and output voltage monitoring circuit 101 configured as described above, an input voltage VIN that is a power supply voltage input to an input terminal T1 is input to the non-inverting input terminal of the differential amplifier 111, and the differential amplifier 111 amplifies the differential voltage between the input voltage VIN and a first reference voltage Vre1 from a reference voltage source 121, and outputs the amplified differential voltage to the selector 113. On the other hand, an output voltage VOUT is input to the non-inverting input terminal of the differential amplifier 112, and the differential amplifier 112 amplifies the differential voltage between the output voltage VOUT and a second reference voltage Vre2 from a reference voltage source 122, and outputs the amplified differential voltage to the selector 113. The selector 113 selects one of the two input voltages according to a predetermined selection condition, and outputs the selected voltage as a comparison result voltage COMP.

Second Comparative Example

Figure 21:
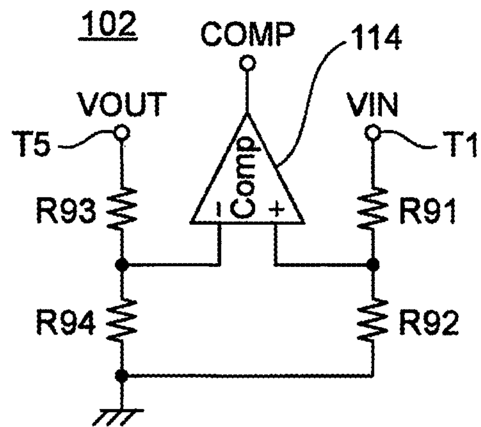
FIG. 21 is a circuit diagram illustrating a configuration of an input and output voltage monitoring circuit 102 according to Second Comparative example.

FIG. 21 is a circuit diagram illustrating a configuration of an input and output voltage monitoring circuit 102 according to Second Comparative example. Referring to FIG. 21, the input and output voltage monitoring circuit 102 is configured to include four resistors R91 to R94 and a comparator 114.

In the input and output voltage monitoring circuit 102 configured as described above, the input voltage VIN that is the power supply voltage input to the input terminal T1 is divided by the voltage dividing resistors R91 and R92, and the divided voltage is input to the non-inverting input terminal of the comparator 114. On the other hand, an output voltage VOUT is divided by the voltage dividing resistors R93 and R94, and the divided voltage is input to the inverting input terminal of the comparator 114. The comparator 114 generates and outputs a comparison result signal COMP of each divided voltage.

As described above, normally, when the comparison result signal related to the input and output voltage difference is generated, a circuit such as the comparator 114 that takes in and compares the input voltage VIN and the output voltage VOUT is required, and the circuit area increases. The circuit of Patent Document 1 described above requires the differential amplifiers 111 and 112 and the selector 113 as illustrated in FIG. 20. In addition, when the voltage detector is used, the voltage dividing circuit that takes in the input voltage VIN and the output voltage VOUT and the comparator 114 that compares the two taken divided voltages are required.

Third Comparative Example

Figure 22:
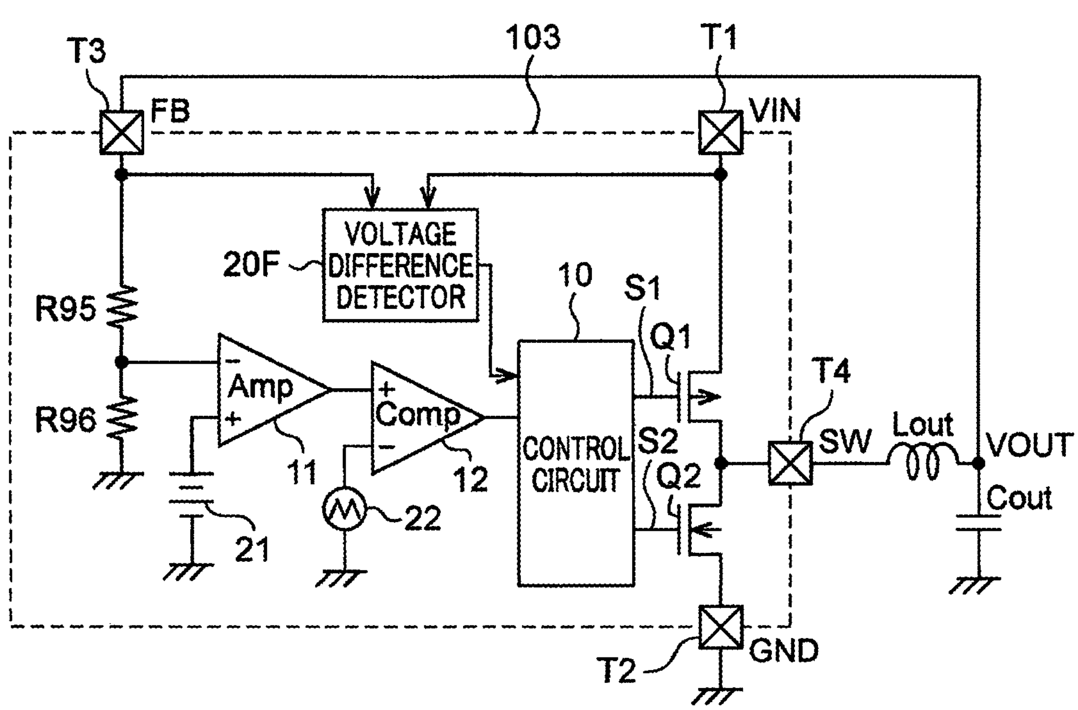
FIG. 22 is a circuit diagram illustrating a configuration of a switching regulator 103 according to Third Comparative example.

FIG. 22 is a circuit diagram illustrating a configuration of a switching regulator 103 according to Third Comparative example. Referring to FIG. 22, a switching regulator 103 is configured to include terminals T1 to T4, voltage dividing resistors R95 and R96, a differential amplifier 11, a comparator 12, a reference voltage source 21, a triangular wave oscillator 22, a control circuit 10 that generates gate control signals S1 and S2 having at least different levels at a predetermined period, MOS transistors Q1 and Q2 that are switching elements, and a voltage difference detector 20F.

The switching output voltage from the terminal T4 of the switching regulator 103 configured as described above is smoothed by an output inductor Lout and a smoothing capacitor Cout to become an output voltage VOUT, and the output voltage VOUT is fed back to the feedback terminal T3. In this case, the terminal T4 is a switching output voltage terminal (SW). In addition, the terminal T3 is a feedback terminal (FB).

The output voltage VOUT input to the terminal T3 is input to the voltage difference detector 20F and is divided by the voltage dividing resistors R95 and R96. The divided voltage is input to the differential amplifier 11, and the differential amplifier 11 amplifies the differential voltage using the reference voltage from the reference voltage source 21, and outputs the amplified differential voltage to the comparator 12. The comparator 12 compares the amplified error voltage with the triangular wave voltage from the triangular wave oscillator 22 to generate a comparison result signal (synchronization control signal) for generating the gate control signals S1 and S2, and outputs the comparison result signal to the control circuit 10. When the comparator 12 is a PWM type comparator, a pulse signal of a comparison result having a narrower pulse width is generated based on the amplified error voltage as the output voltage VOUT becomes lower than the reference voltage. On the other hand, the voltage difference detector 20F detects the voltage difference of the two input voltages, and outputs an error signal of the voltage difference to the control circuit 10. Based on the error signal of the voltage difference and the pulse signal of the comparison result, the control circuit 10 generates gate control signals S1 and S2, and applies the gate control signals S1 and S2 to the gates of the MOS transistors Q1 and Q2, respectively, as has been known, to control on and off of the MOS transistors Q1 and Q2.

Fourth Comparative Example

Figure 23:
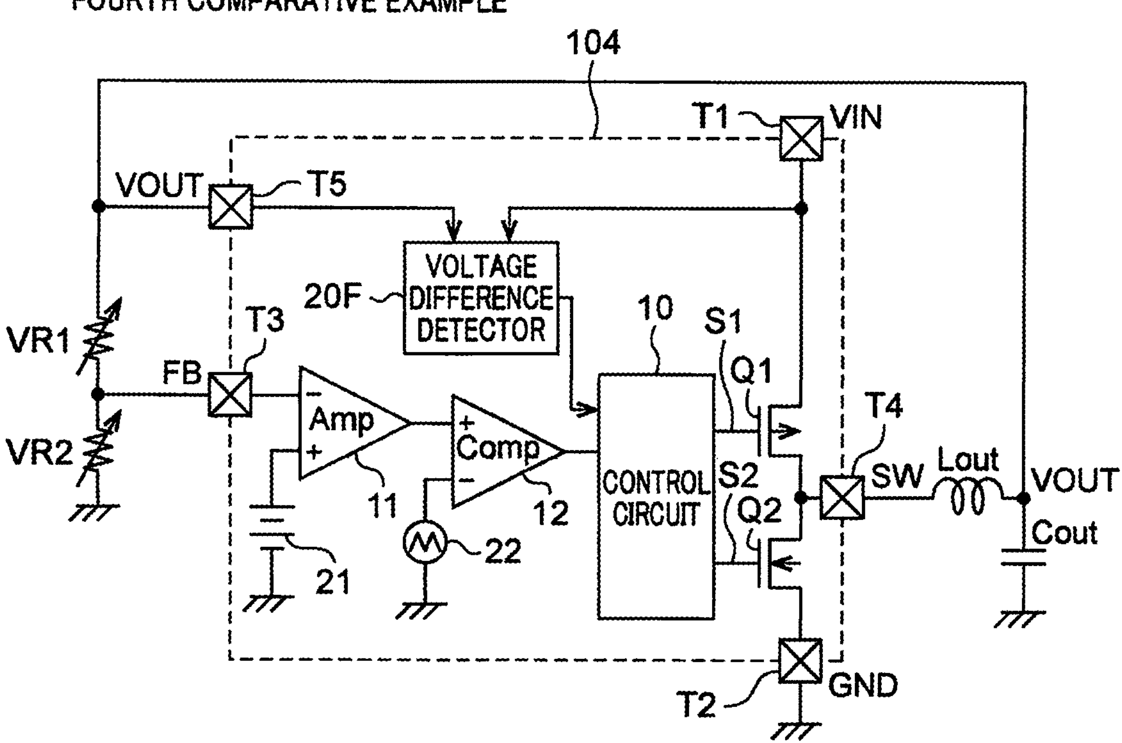
FIG. 23 is a circuit diagram illustrating a configuration of a switching regulator 104 according to Fourth Comparative example.

FIG. 23 is a circuit diagram illustrating a configuration of a switching regulator 104 according to Fourth Comparative example. Referring to FIG. 23, the switching regulator 104 is different from the switching regulator 103 in FIG. 22 in the following points.

(1) The voltage dividing resistors R95 and R96 are replaced with variable resistors VR1 and VR2 arranged outside the switching regulator 104.

As illustrated in FIG. 22 according to Third Comparative example, a circuit that feeds back an output voltage VOUT can monitor the output voltage VOUT. However, as illustrated in FIG. 23 according to Fourth Comparative example, when the output voltage VOUT is externally adjusted using the variable resistors VR1 and VR2, since there is no monitoring destination, it is necessary to add an unnecessary terminal T5 (VOUT).

In the embodiment according to the present invention, there is provided a switching regulator capable of generating a comparison result signal related to an input and output voltage difference even with no terminal for monitoring an output voltage in the switching regulator. Specifically, when an input and output voltage difference is detected in a circuit that cannot take in the output voltage VOUT, a voltage obtained by time-integrating the switching voltage is detected using a threshold value dependent on the power supply voltage.

First Embodiment

Figure 2:
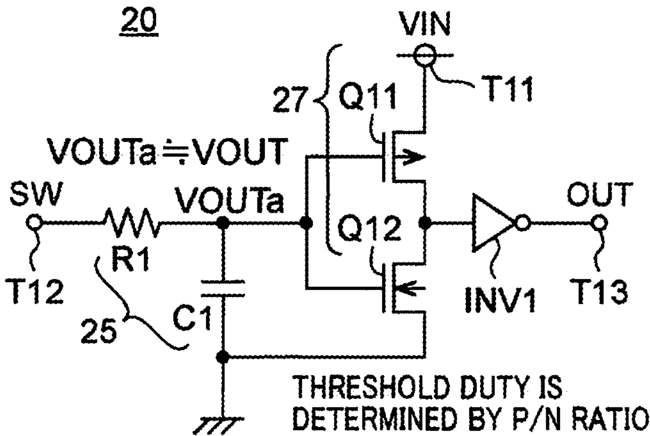
FIG. 2 is a circuit diagram of a configuration example illustrating operation of a voltage difference detector 20 of the switching regulator 1 in FIG. 1.

FIG. 1 is a circuit diagram illustrating a configuration example of a switching regulator 1 according to a first embodiment. In addition, FIG. 2 is a circuit diagram of a configuration example illustrating operation of a voltage difference detector 20 of the switching regulator 1 in FIG. 1.

Referring to FIG. 1, a switching regulator 1 is configured to include the terminals T1 to T4, variable resistors VR1 and VR2, the differential amplifier 11, the comparator 12, the reference voltage source 21, a triangular wave oscillator 22, a control circuit 10 that generates the gate control signals S1 and S2 having at least different levels at a predetermined period, MOS transistors Q1 and Q2 that are switching elements and configure a switching circuit, and a voltage difference detector 20. Referring to FIG. 2, the voltage difference detector 20 is configured to include an integrator circuit 25 including a resistor R1 and a capacitor C1, a comparator circuit 27 including MOS transistors Q11 and Q12, and an inverter INV1. In this case, the MOS transistor Q1 is a P-channel MOS transistor (PMOSFET), and the MOS transistor Q2 is an N-channel MOS transistor (NMOSFET).

The comparator circuit 27 is configured by connecting a P-channel MOS transistor (PMOS transistor) Q11 and an N-channel MOS transistor (NMOS transistor) Q12 in series between an input voltage VIN of the power supply voltage VDD and the ground, and compares the output voltage of the integrator circuit 25 using a threshold value dependent on the power supply voltage VDD to output a comparison result signal.

The output voltage from the terminal T4 of the switching regulator 1 configured as described above is smoothed by the output inductor Lout and the smoothing capacitor Cout to become the output voltage VOUT, and the output voltage VOUT is fed back to the feedback terminal T3 via the variable resistor VR1. The voltage obtained by resistance-dividing the output voltage VOUT is input to the differential amplifier 11 via the terminal T3, and the differential amplifier 11 amplifies the differential voltage between the divided voltage and the reference voltage and inputs the differential voltage to the non-inverting input terminal of the comparator 12. The comparator 12 compares the amplified error voltage with the triangular wave voltage from the triangular wave oscillator 22 to generate a comparison result signal (synchronization control signal) for generating the gate control signals S1 and S2, and outputs the comparison result signal to the control circuit 10. When the comparator 12 is the PWM type comparator, a pulse signal of a comparison result having a narrower pulse width is generated based on the amplified error voltage as the output voltage VOUT becomes lower than the reference voltage. On the other hand, the input voltage VIN, which is the power supply voltage VDD input to the terminal T1, and the output voltage of the terminal T4 are input to the voltage difference detector 20. The voltage difference detector 20 time-integrates the output voltage of the terminal T4 by the integrator circuit 25, and then outputs the time-integrated output voltage to the control circuit 10 via the comparator circuit 27 that performs comparison operation, the inverter INV1, and the terminal T13. Based on the comparison result signal from the voltage difference detector 20 and the pulse signal of the comparison result from the comparator 12, the control circuit 10 generates gate control signals S1 and S2 and applies the gate control signals S1 and S2 to the gates of the MOS transistors Q1 and Q2, respectively, as has been known, to control on and off of the MOS transistors Q1 and Q2.

In this case, the integration constant is set such that the output voltage VOUTa of the integrator circuit 25 substantially matches the output voltage VOUT, the comparator circuit 27 operates with the input voltage VIN as the power supply voltage, and the threshold value duty of the comparator circuit 27 is determined by the ratio between the gate size of the PMOS transistor Q11 and the gate size of the NMOS transistor Q12. In this case, since the output voltage VOUTa of the integrator circuit 25 substantially matches the output voltage VOUT, it can be said to be a "pseudo-output voltage".

As described above, with no terminal for monitoring the output voltage VOUT, the switching regulator 1 in FIG. 1 monitors the SW voltage at the terminal T4 without adding the terminal of the output voltage VOUT. The voltage difference detector 20 in FIG. 2 generates a pseudo-output voltage (pseudo-output voltage) VOUTa after time-integrating the SW voltage, and the comparator circuit 27 compares the pseudo-output voltage VOUTa with the threshold value dependent on the power supply voltage VDD to generate and output the comparison result signal.

Figure 3:
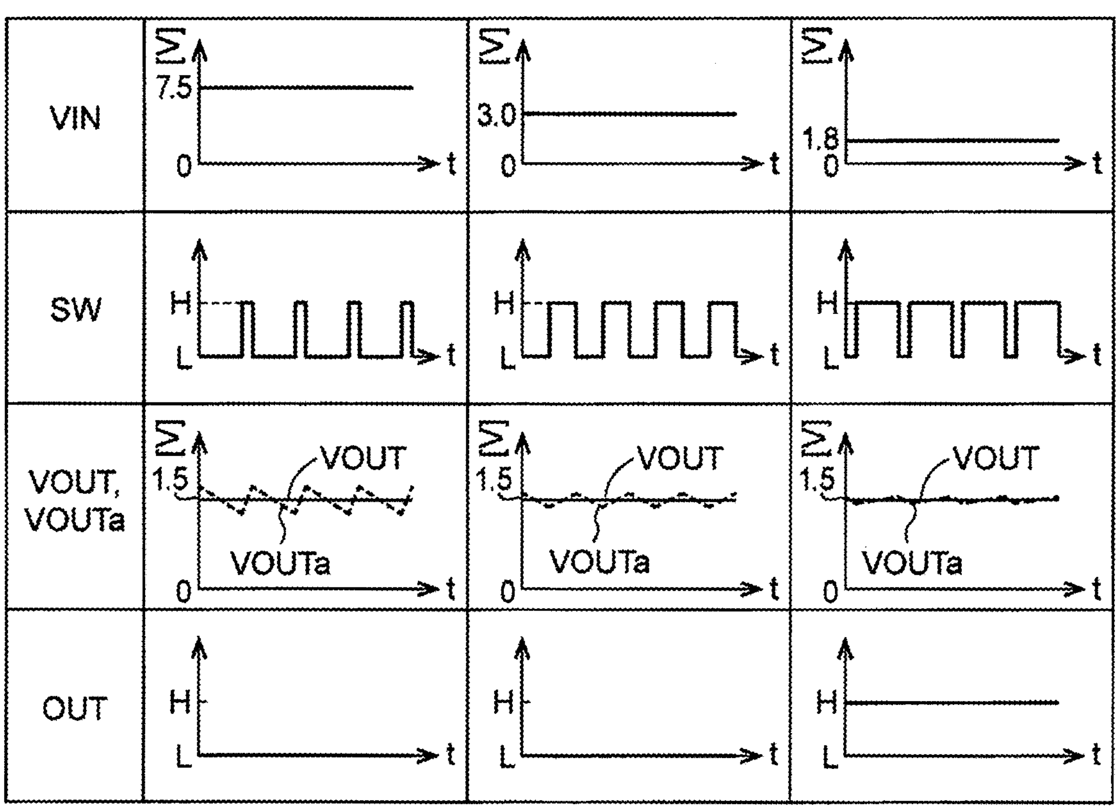
FIG. 3 is a timing chart of each signal illustrating operation when a PWM type is used in the switching regulator 1 in FIG. 1.

FIG. 3 is a timing chart of each signal illustrating operation when a PWM type is used in the switching regulator 1 in FIG. 1. FIG. 3 illustrates the voltage VOUTa generated from the SW voltage different from the input voltage VIN and the voltage difference detection signal OUT. The ripple voltage of the voltage VOUTa in FIG. 3 is about several mV to several tens of mV. In this case, when the PN ratio (gate size ratio between the PMOS transistor Q11 and the NMOS transistor Q12) is adjusted so that the threshold value of the comparator circuit 27 becomes 75%, the detection signal is configured to rise from the L level to the H level under a condition that the output voltage VOUT exceeds 75% of the power supply voltage VDD.

Figure 4:
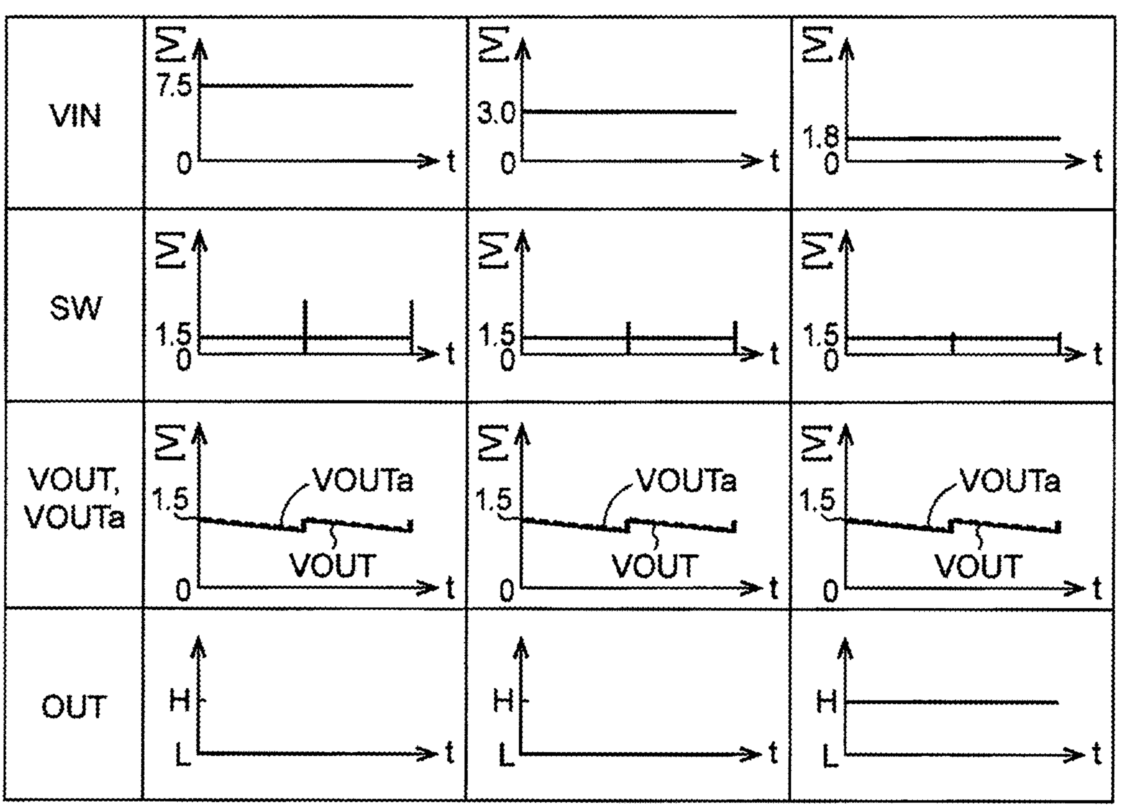
FIG. 4 is a timing chart of each signal illustrating operation when a PFM type is used in the switching regulator 1 in FIG. 1.

FIG. 4 is a timing chart of each signal illustrating operation when a PFM type is used in the switching regulator 1 in FIG. 1, and the signal can be detected in a PFM type of skipping operation in addition to a PWM type of continuous operation in FIG. 3. The ripple voltages of the voltages VOUT and VOUTa in FIG. 4 are about several mV to several tens of mV.

The integral multiplier (time constant) of the integrator circuit 25 can be optimized to a multiplier according to the oscillation frequency of the switching regulator 1. In addition, even when the terminal of the output voltage VOUT is provided, it is effective to reduce the area of the circuit by changing the application of the SW voltage to the application of the output voltage VOUT.

As described above, according to the first embodiment, in the switching regulator, the comparison result signal related to the input and output voltage difference can be generated even with no terminal for monitoring the output voltage.

Next, a plurality of modified embodiments of the voltage difference detector 20 will be described below.

First Modified Embodiment

Figure 5:
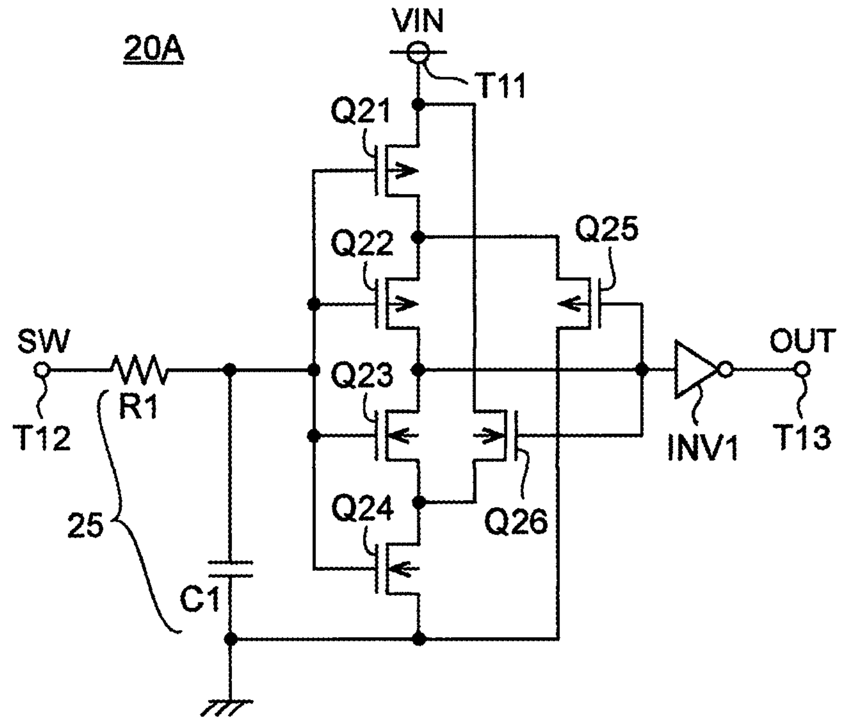
FIG. 5 is a circuit diagram illustrating a configuration example of a voltage difference detector 20A according to a first modified embodiment.

FIG. 5 is a circuit diagram illustrating a configuration example of a voltage difference detector 20A according to a first modified embodiment. The voltage difference detector 20A in FIG. 5 is different from the voltage difference detector 20 in FIG. 2 in the following points.

(1) Instead of the MOS transistors Q11 and Q12, four MOS transistors Q21 to Q24 connected in series and hysteresis characteristic generation MOS transistors Q25 and Q26 are provided. In this case, the MOS transistors Q21, Q22, and Q25 are P-channel MOS transistors (PMOSFETs), and the MOS transistors Q23, Q24, and Q26 are N-channel MOS transistors (NMOSFETs).

Second Modified Embodiment

Figure 6:
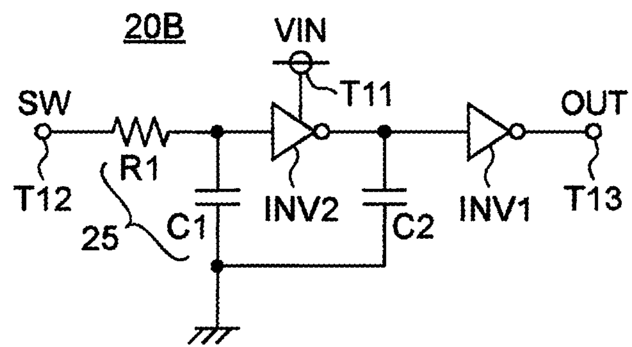
FIG. 6 is a circuit diagram illustrating a configuration example of a voltage difference detector 20B according to a second modified embodiment.

FIG. 6 is a circuit diagram illustrating a configuration example of a voltage difference detector 20B according to a second modified embodiment. The voltage difference detector 20B in FIG. 6 is different from the voltage difference detector 20 in FIG. 2 in the following points.

(1) Instead of the MOS transistors Q11 and Q12, a delay generation inverter INV2 and a capacitor C2 are provided.

Third Modified Embodiment

Figure 7:
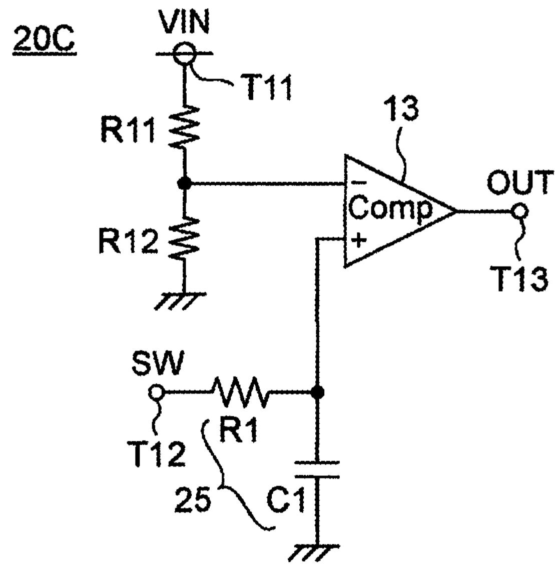
FIG. 7 is a circuit diagram illustrating a configuration example of a voltage difference detector 20C according to a third modified embodiment.

FIG. 7 is a circuit diagram illustrating a configuration example of a voltage difference detector 20C according to a third modified embodiment. The voltage difference detector 20C in FIG. 7 is different from the voltage difference detector 20 in FIG. 2 in the following points.

(1) Instead of the MOS transistors Q11 and Q12 and the inverter INV1, voltage dividing resistors R11 and R12 and a comparator 13 are provided. In this case, the voltage dividing resistors R11 and R12 apply a voltage obtained by dividing the input voltage VIN to the inverting input terminal of the comparator 13. The output voltage of the integrator circuit 25 is applied to the non-inverting input terminal of the comparator 13. The comparator 13 outputs a comparison result signal obtained by comparing these two voltages from the terminal T13.

Fourth Modified Embodiment

Figure 8:
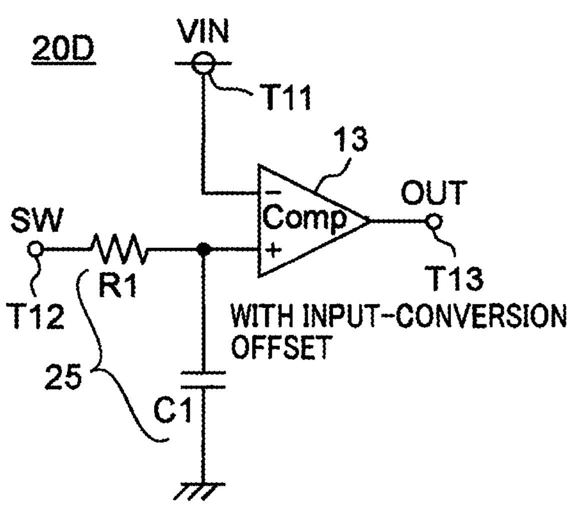
FIG. 8 is a circuit diagram illustrating a configuration example of a voltage difference detector 20D according to a fourth modified embodiment.

FIG. 8 is a circuit diagram illustrating a configuration example of a voltage difference detector 20D according to a fourth modified embodiment. The voltage difference detector 20D in FIG. 8 is different from the voltage difference detector 20 in FIG. 2 in the following points.

(1) Instead of the MOS transistors Q11 and Q12 and the inverter INV1, the comparator 13 with a level shifter for input conversion is provided. In this case, the input voltage VIN is applied to the inverting input terminal of the comparator 13, and the output voltage of the integrator circuit 25 is applied to the non-inverting input terminal of the comparator 13.

Fifth Modified Embodiment

Figure 9:
FIG. 9 is a circuit diagram illustrating a configuration example of a voltage difference detector 20E according to a fifth modified embodiment.
Figure 9:
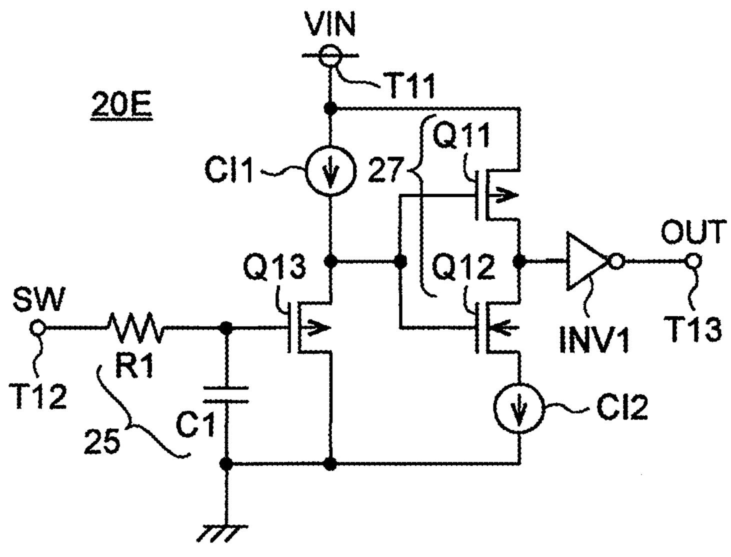

FIG. 9 is a circuit diagram illustrating a configuration example of a voltage difference detector 20E according to a fifth modified embodiment. The voltage difference detector 20E in FIG. 9 is different from the voltage difference detector 20 in FIG. 2 in further including the following components.

(1) A constant current source CI1 connected between the terminal T11 of the input voltage VIN and the gates of MOS transistors Q11 and Q12;

(2) A constant current source CI2 connected between the source of the MOS transistor Q12 and the ground; and (3) A MOS transistor Q13 inserted between an integrator circuit 25 and a comparator circuit 27.

In this case, the circuit between the integrator circuit 25 and the inverter INV1 configures a constant current inverter circuit.

Second Embodiment

Figure 10:
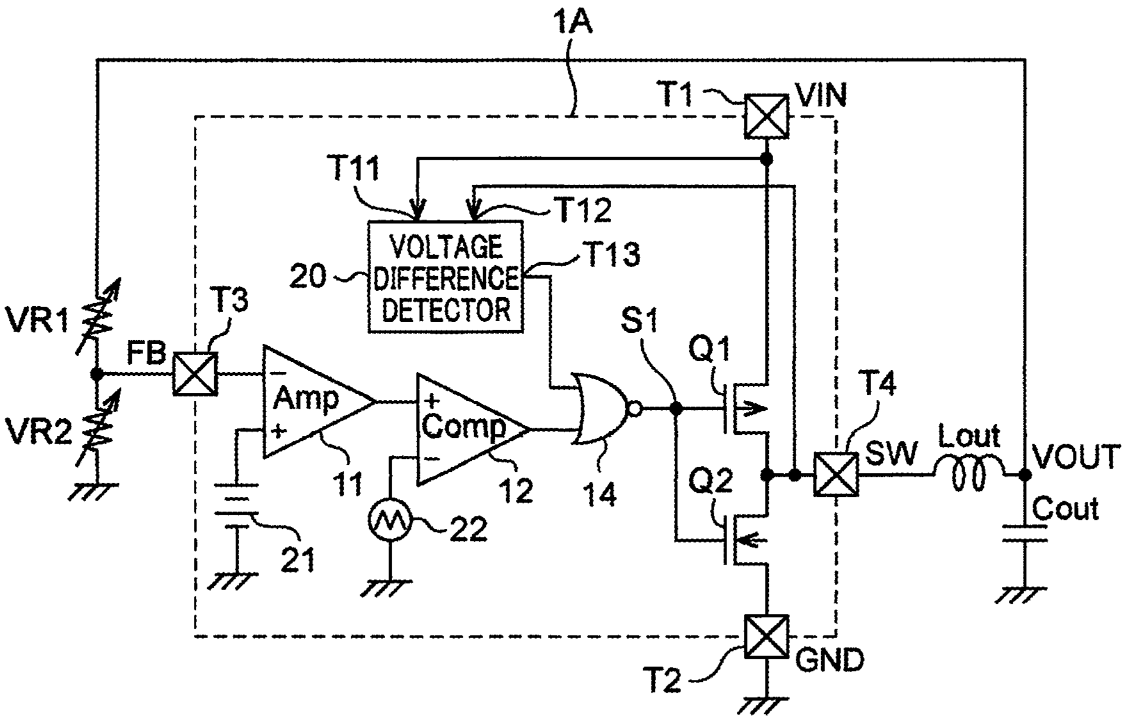
FIG. 10 is a circuit diagram illustrating a configuration example of a switching regulator 1A according to a second embodiment.

FIG. 10 is a circuit diagram illustrating a configuration example of a switching regulator 1A according to a second embodiment. The switching regulator 1A in FIG. 10 is different from the switching regulator 1 in FIG. 1 in the following points.

(1) A NOR gate 14 is provided instead of the control circuit 10.

In this case, the output voltage of the voltage difference detector 20 is input to the first input terminal of the NOR gate 14, and the output voltage of the comparator 12 is input to the second input terminal of the NOR gate 14. The NOR gate 14 applies the output voltage as the gate control signal S1 to the gates of the MOS transistors Q11 and Q12. Thus, the voltage control type switching regulator 1A is configured.

As described above, according to the second embodiment, in the switching regulator, the comparison result signal related to the input and output voltage difference can be generated even with no terminal for monitoring the output voltage.

The differential amplifier 11, the comparator 12, the reference voltage source 21, and the triangular wave oscillator 22 may be collectively formed into a block as the switching modulation circuit. The same applies to the following embodiments.

Third Embodiment

Figure 11:
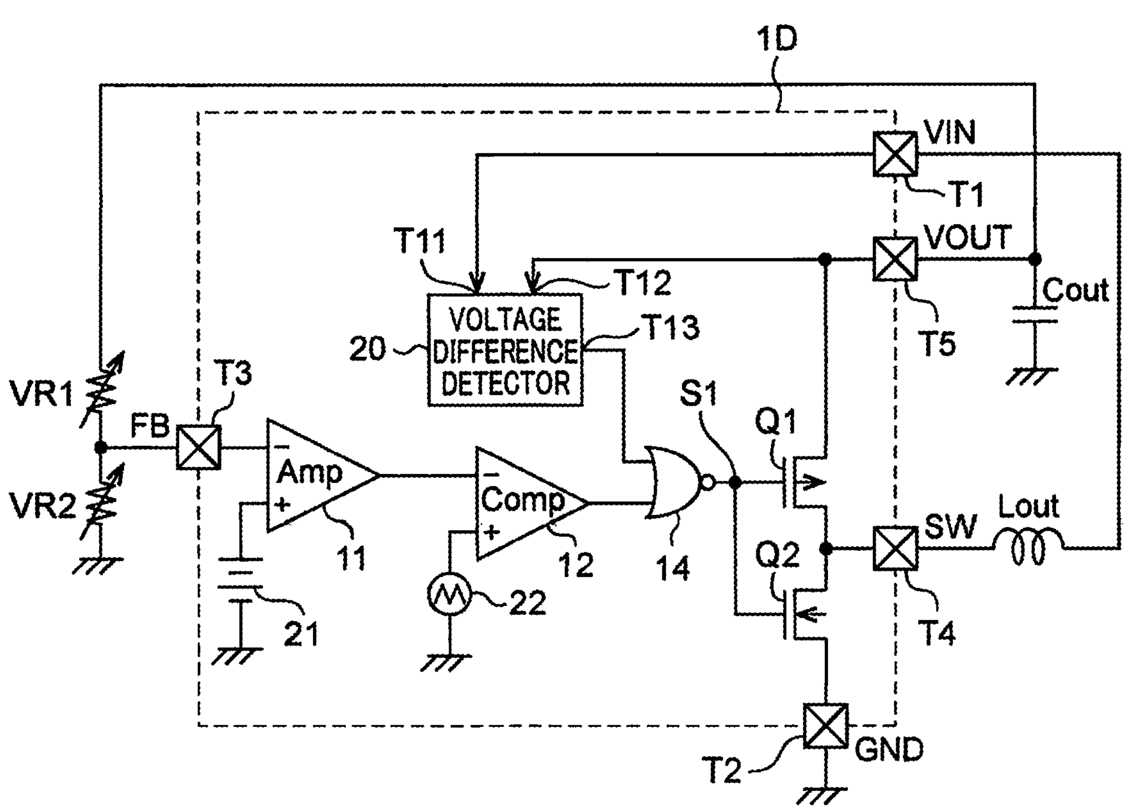
FIG. 11 is a circuit diagram illustrating a configuration example of a switching regulator 1D according to a third embodiment.

FIG. 11 is a circuit diagram illustrating a configuration example of a switching regulator 1D according to a third embodiment. In the switching regulator 1D in FIG. 11, the circuit in the switching regulator is the same except for the connection between the switching regulator 1A in FIG. 10 and the terminals T1 and T5, but the following points are different from the switching regulator 1A.

(1) The input voltage VIN of the terminal T1 is input from the terminal T4 via the input inductor Lout and is input to the voltage difference detector 20.

(2) The drain voltage of the MOS transistor Q1 is output to the voltage difference detector 20, and is output as the output voltage VOUT to the voltage dividing resistors VR1 and VR2 via the output capacitor Cout.

Thus, the switching regulator in the step-up mode is configured.

As described above, according to the third embodiment, in the switching regulator, the comparison result signal related to the input and output voltage difference can be generated even with no terminal for monitoring the output voltage.

Fourth Embodiment

Figure 12:
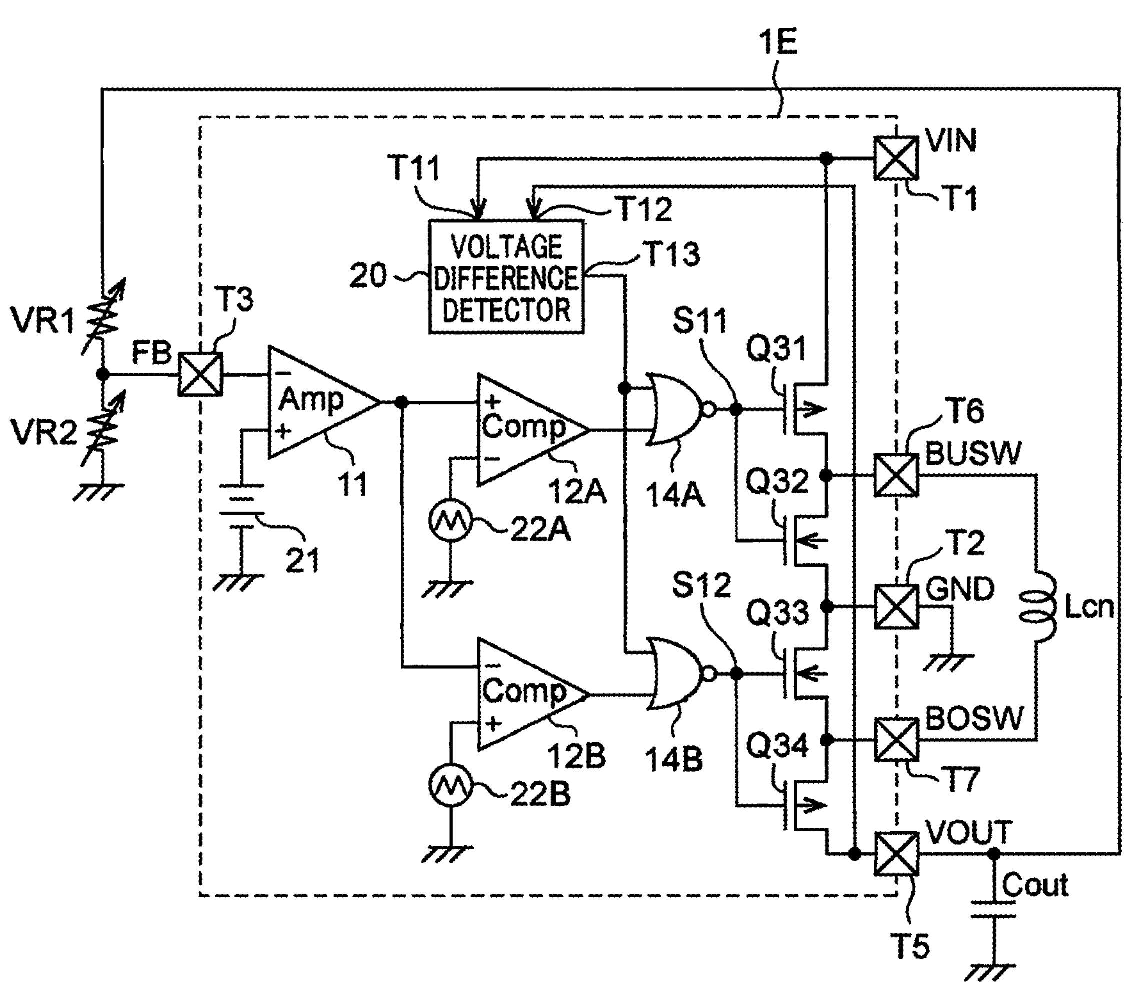
FIG. 12 is a circuit diagram illustrating a configuration example of a switching regulator 1E according to a fourth embodiment.

FIG. 12 is a circuit diagram illustrating a configuration example of a switching regulator 1E according to a fourth embodiment. The switching regulator 1E in FIG. 12 is different from the switching regulator 1A in FIG. 10 in the following points.

(1) In place of the comparator 12 having the triangular wave oscillator 22, comparators 12A and 12B having triangular wave oscillators 22A and 22B, respectively, are provided.

(2) NOR gates 14A and 14B are provided instead of the NOR gate 14.

(3) MOS transistors Q33 and Q34 are provided between the output inductor Lout and the output capacitor Cout.

(4) The terminal T5 is connected to the terminal T12 of the voltage difference detector 20 instead of the terminal T4.

In this case, the MOS transistors Q31 and Q34 are P-channel MOS transistors (PMOSFETs), and the MOS transistors Q32 and Q33 are N-channel MOS transistors (NMOSFETs).

Referring to FIG. 12, the output voltage from the differential amplifier 11 is input to the inverting input terminals of the comparators 12A and 12B. The comparison result signals of the comparators 12A and 12B are output to the gates of the MOS transistors Q31 and Q32 and the gates of the MOS transistors Q33 and Q34 via the NOR gates 14A and 14B, respectively. In this case, the source of the MOS transistor Q31 is connected to the terminal T1 of the input voltage VIN and the voltage difference detector 20, and the connection point of the drains of the MOS transistors Q31 and Q32 is connected to the connection point of the drain of the MOS transistor Q33 and the source of Q34 via a terminal T6, a connection capacitor Len, and a terminal T7. The connection point of the sources of the MOS transistors Q32 and Q33 is grounded. The drain of the MOS transistor Q34 is connected to the terminal T5, and the output voltage VOUT from the terminal T5 is connected to voltage dividing resistors VR1 and VR2 via the output capacitor Cout.

In this case, the terminal T6 is a step-down side switching voltage terminal (BUSW), and the terminal T7 is a step-up side switching voltage terminal (BOSW).

The switching regulator 1E configured as described above operates in the step-up or down mode.

As described above, according to the fourth embodiment, in the switching regulator, the comparison result signal related to the input and output voltage difference can be generated even with no terminal for monitoring the output voltage.

Fifth Embodiment

Figure 13:
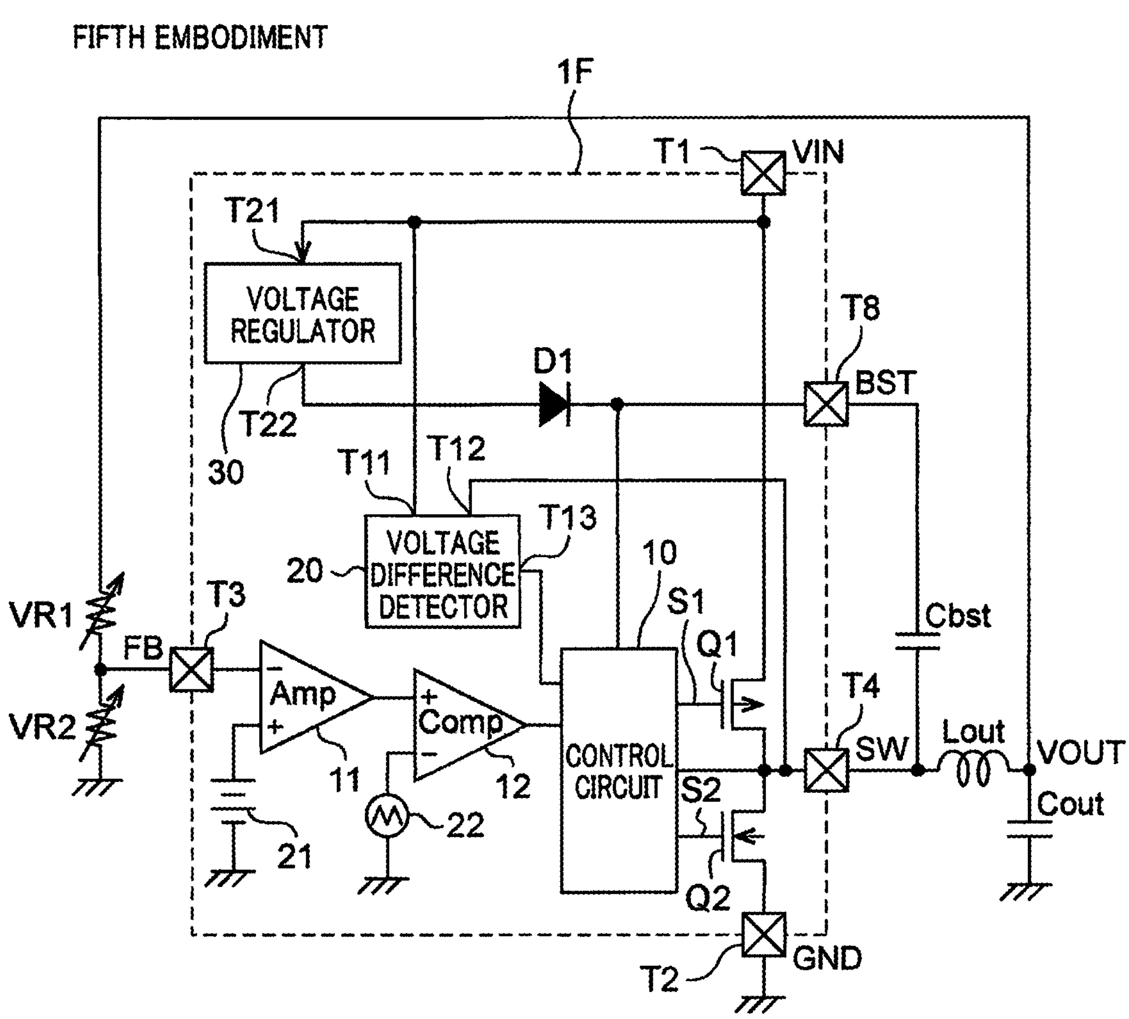
FIG. 13 is a circuit diagram illustrating a configuration example of a switching regulator 1F according to a fifth embodiment.

FIG. 13 is a circuit diagram illustrating a configuration example of a switching regulator 1F according to a fifth embodiment. The switching regulator 1F in FIG. 13 is different from the switching regulator 1 in FIG. 1 in the following points.

(1) A voltage regulator 30, a diode D1, a boost terminal T8, and a boost capacitor Cbst are further provided.

Referring to FIG. 13, an input voltage VIN is input to the voltage regulator 30 and the voltage difference detector 20. After adjusting the input voltage VIN to be input to a predetermined voltage, the voltage regulator 30 outputs the input voltage VIN to the control circuit 10 via the diode D1, and outputs the input voltage VIN via the boost terminal T8, the boost capacitor Cbst, the output inductor Lout, and the output capacitor Cout to be the output voltage VOUT. The other configurations are similar to those in FIG. 1, and thus, a so-called NN (N-channel-N channel) bootstrap switching regulator is configured.

As described above, according to the fifth embodiment, in the switching regulator, the comparison result signal related to the input and output voltage difference can be generated even with no terminal for monitoring the output voltage.

The voltage difference detector 20 is then adaptable to an electronic circuit that monitors the power supply voltage and the output voltage to control the switching regulator as described below, for use applications different from those described above.

Sixth Embodiment

FIG. 14 is a circuit diagram illustrating a configuration example of a switching regulator 1G according to a sixth embodiment. In FIG. 14, the switching regulator 1G is different from the switching regulator 1A in FIG. 10 in the following points.

(1) The comparator 12, the reference voltage source 21, a pulse oscillator 26, and a set-reset-type flip-flop 16 are provided instead of the differential amplifier 11, the comparator 12, the reference voltage source 21, and the triangular wave oscillator 22.

(2) The comparison result signal from the voltage difference detector 20 is input to the first input terminal of the NOR gate 14. The output signal from the set-reset-type flip-flop 16 is output as the gate control signal S1 to the gate of the MOS transistor Q1 via the inverter INV11.

(3) The output signal of the inverter INV11 is output to the second input terminal of the NOR gate 14 via the inverter INV12.

(4) The output signal of the NOR gate 14 is applied to the gate of the MOS transistor Q2 as a gate control signal S2.

Referring to FIG. 14, the comparator 12 compares the divided voltage of the output voltage VOUT with the reference voltage source from the reference voltage source 21, and outputs the comparison result signal to the set terminal of the set-reset-type flip-flop 16 and the control terminal of the pulse oscillator 26. The pulse oscillator 26 generates a pulse signal in synchronization with the comparison result signal, and outputs the pulse signal to the reset terminal of the set-reset-type flip-flop 16. The switching regulator 1C configured as described above operates in a so-called hysteresis control method or system.

In the switching regulator 1G configured as described above, since the voltage difference detector 20 and the NOR gate 14 are provided, the peak value of the inductor current becomes small in the low input and output voltage state, and the reverse flow can be prevented in the case of a possibility of the reverse flow current.

As described above, according to the sixth embodiment, in the switching regulator, the comparison result signal related to the input and output voltage difference can be generated even with no terminal for monitoring the output voltage.

Seventh Embodiment

FIG. 15 is a circuit diagram illustrating a configuration example of a switching regulator 1H according to a seventh embodiment. Referring to FIG. 15, the switching regulator 1H in FIG. 15 is different from the switching regulator 1G in FIG. 14 in the following points.

(1) A zero-cross detector 40 is inserted between the voltage difference detector 20 and the input terminal of the NOR gate 14.

(2) A current detector 2 is inserted between the terminal T4 and the output inductor Lout.

In this case, when the current value from the current detector 2 crosses O or when the voltage difference from the voltage difference detector 20 is within a predetermined voltage range, the zero-cross detector 40 outputs the H level detection signal to the NOR gate 14.

In the switching regulator 1H configured as described above, since the voltage difference detector 20, the zero-cross detector 40, and the NOR gate 14 are provided, the peak value of the inductor current becomes small in the low input and output voltage state, and the reverse flow can be prevented in the case of a possibility of the reverse flow current.

As described above, according to the ninth embodiment, in the switching regulator, the comparison result signal related to the input and output voltage difference can be generated even with no terminal for monitoring the output voltage.

Eighth Embodiment

FIG. 16 is a circuit diagram illustrating a configuration example of a switching regulator 1I according to an eighth embodiment. The switching regulator 1I in FIG. 16 is different from the switching regulator 1A in FIG. 10 in the following points.

(1) The inverter INV11 is provided instead of the NOR gate 14.

(2) The comparison result signal from the voltage difference detector 20 is input to the pulse oscillator 26.

In the switching regulator 1I configured as described above, the pulse oscillator 26 generates a pulse signal in synchronization with the comparison result signal or within a predetermined voltage range of the comparison result signal, and outputs the pulse signal to a reset terminal of a set-reset-type flip-flop 16.

In the switching regulator 1I configured as described above, since the comparison result signal from the voltage difference detector 20 is input to the pulse oscillator 26, the timer time can be varied within a predetermined voltage range of the comparison result signal. As a result, the control time related to the gate control of the switching element can be adjusted.

Ninth Embodiment

Figure 17:
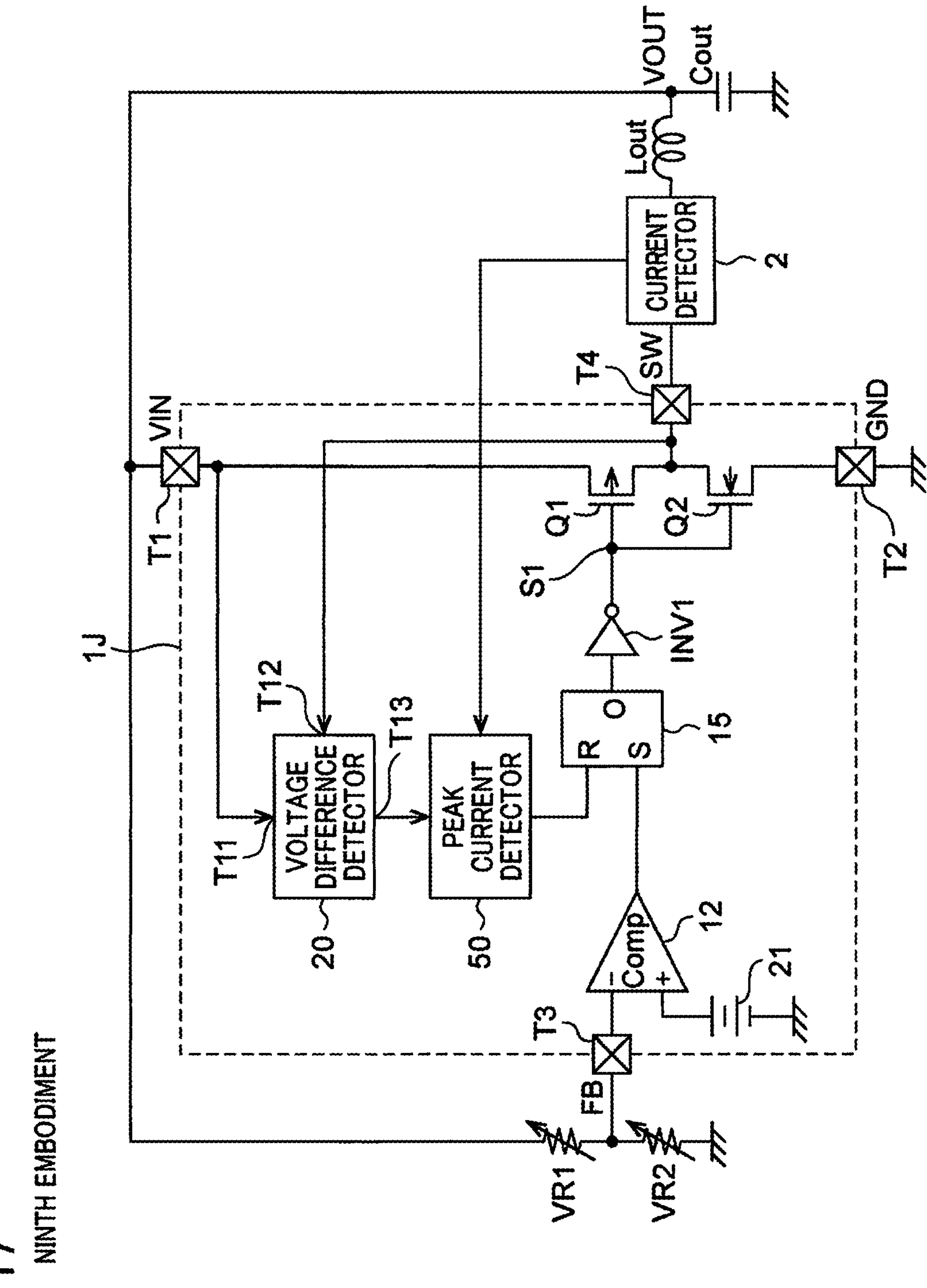
FIG. 17 is a circuit diagram illustrating a configuration example of a switching regulator 1J according to a ninth embodiment.

FIG. 17 is a circuit diagram illustrating a configuration example of a switching regulator 1J according to a ninth embodiment. The switching regulator 1J in FIG. 17 is different from the switching regulator 1A in FIG. 10 in the following points.

(1) The current detector 2 that detects the inductor current, and outputs the detected current value to a peak current detector 50 is inserted between the terminal T4 and the output inductor Lout.

(2) The comparison result signal from the voltage difference detector 20 is input to the peak current detector 50.

(3) When the comparison result signal is within a predetermined voltage range, the peak current detector 50 detects a peak current based on the inductor current detected by the current detector 2, and outputs a detection signal to the reset terminal of the set-reset-type flip-flop 15.

(4) The comparison result signal of the comparator 12 is output to the set terminal of the set-reset-type flip-flop 15.

According to the switching regulator 1J configured as described above, the current detection threshold value can be adjusted by resetting the switching operation when the predetermined peak current is reached.

In the switching regulator 1J configured as described above, since the comparison result signal from the voltage difference detector 20 is input to the peak current detector 50, a pulse signal can be generated within a predetermined voltage range of the comparison result signal to reset the set-reset-type flip-flop 15. As a result, the switching operation threshold value related to the gate control of the switching element can be adjusted.

As described above, according to the ninth embodiment, in the switching regulator, the comparison result signal related to the input and output voltage difference can be generated even with no terminal for monitoring the output voltage.

Tenth Embodiment

FIG. 18 is a circuit diagram illustrating a configuration example of a switching regulator 1K according to a tenth embodiment. The switching regulator 1K in FIG. 18 is different from the switching regulator 1G in FIG. 14 in the following points.

(1) The comparison result signal from the voltage difference detector 20 is input to a soft-start circuit 60.

(2) The output signal of the soft-start circuit 60 is input to the non-inverting input terminal of the comparator 12.

In the switching regulator 1K configured as described above, since the comparison result signal from the voltage difference detector 20 is input to the soft-start circuit 60, the comparison result signal is soft-started with a delay of a predetermined time using the reference voltage from the reference voltage source 21 within a predetermined voltage range to generate a predetermined trigger signal, which is then input to the inverting input terminal of the comparator 12. As a result, the set-reset-type flip-flop 16 can be reset and then set by the H-level set signal from the comparator 12 and the trigger signal to the pulse oscillator 26. As a result, the gate control signal related to the gate control of the switching element can be soft-started.

As described above, according to the tenth embodiment, in the switching regulator, the comparison result signal related to the input and output voltage difference can be generated even with no terminal for monitoring the output voltage.

Eleventh Embodiment

Figure 19:
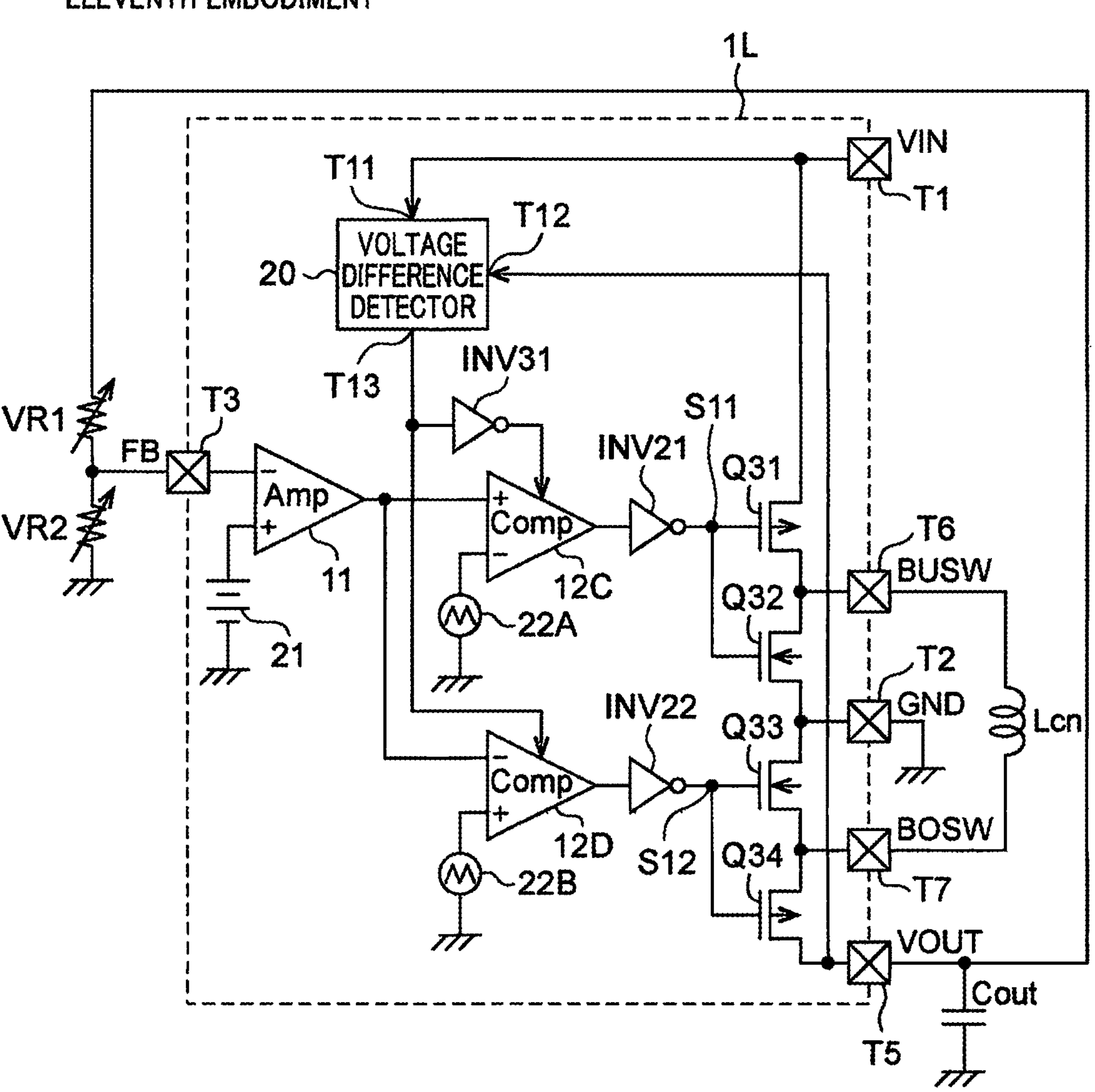
FIG. 19 is a circuit diagram illustrating a configuration example of a switching regulator 1L according to an eleventh embodiment.

FIG. 19 is a circuit diagram illustrating a configuration example of a switching regulator 1L according to an eleventh embodiment. The switching regulator 1L in FIG. 19 is different from the switching regulator 1E in FIG. 12 in the following points.

(1) Inverters INV21 and INV22 are provided instead of the NOR gates 14A and 14B, respectively.

(2) Comparators 12C and 12D are provided instead of the comparators 12A and 12B, respectively. The comparison result signal from the voltage difference detector 20 is input to the control terminal of the comparator 12C via an inverter INV31, and is input to the control terminal of 12D. In this case, when the comparison result signal falls within a predetermined first voltage range, the comparator 12C is operated, and when the comparison result signal falls within a second voltage range different from the first voltage range, the comparator 12D is operated.

According to the switching regulator 1L configured as described above, the operations of the comparator 12C and the comparator 12D can be selectively switched according to the voltage difference from the voltage difference detector 20.

As described above, according to the eleventh embodiment, in the switching regulator, the comparison result signal related to the input and output voltage difference can be generated even with no terminal for monitoring the output voltage.

Other Modified Embodiment

In the above embodiments and modified embodiments, the MOS transistors Q1 to Q31 which are switching elements are provided in the circuits of the switching regulators 1 and 1A to 1L, but the present invention is not limited thereto, and may be provided outside the circuits of the switching regulators 1 and 1A to 1L.

INDUSTRIAL APPLICABILITY

As mentioned in detail above, according to the switching regulator of the present invention, since the comparison result signal is generated by comparing the voltage obtained by time-integrating the switching voltage with the threshold value dependent on the power supply voltage, it is possible to generate the comparison result signal related to the input and output voltage difference even with no terminal for monitoring the output voltage.

The invention claimed is:

1. A switching regulator comprising:

a switching circuit configured to switch an input voltage based on a predetermined gate control signal, and output a switching voltage;

a voltage difference detector configured to compare the switching voltage with a threshold value dependent on the input voltage, and output a comparison result signal; and a control circuit configured to generate the gate control signal based on an output voltage which is obtained by smoothing the switching voltage and is fed back, and the comparison result signal, and output the gate control signal to the switching circuit, wherein the voltage difference detector comprises:

an integrator circuit configured to generate and output a pseudo-output voltage that is obtained by time-integrating the switching voltage and is substantially equal to the output voltage; and a comparator circuit configured to compare the pseudo-output voltage with a threshold value dependent on a power supply voltage, and output the comparison result signal.

2. The switching regulator as claimed in claim 1, wherein the comparator circuit includes two MOS transistors connected in series.

3. The switching regulator as claimed in claim 1, wherein the comparator circuit has a hysteresis characteristic and includes four MOS transistors connected in series.

4. The switching regulator as claimed in claim 1, wherein the comparator circuit includes an inverter and an output capacitor connected at a post stage of the inverter.

5. The switching regulator as claimed in claim 1, wherein the comparator circuit includes a comparator configured to compare a voltage corresponding to the input voltage with the time-integrated voltage, and output the comparison result signal.

6. The switching regulator as claimed in claim 5, wherein the voltage corresponding to the input voltage is obtained by level-shifting the input voltage.

7. The switching regulator as claimed in claim 1, wherein the comparator circuit includes a constant current inverter circuit.

8. The switching regulator as claimed in claim 1, wherein the switching regulator is a voltage control type, a current control type, or a hysteresis control type switching regulator.

9. The switching regulator as claimed in claim 1, wherein the switching regulator is a step-up type or a step-up or down type switching regulator.

10. The switching regulator as claimed in claim 1, wherein the switching regulator monitors the input voltage and the output voltage to control operation of the switching regulator.

* * * * *